March 21, 1961 M. C. BARTZ 2,976,485
CONTINUITY TESTING DEVICE FOR EXPLOSIVE IGNITING CIRCUITS
Filed March 30, 1959

INVENTOR.
MELVIN C. BARTZ
BY Robert C. Smith
ATTORNEY

2,976,485

CONTINUITY TESTING DEVICE FOR EXPLOSIVE IGNITING CIRCUITS

Melvin C. Bartz, South Bend, Ind., assignor to The Bendix Corporation, a corporation of Delaware Filed Mar. 30, 1959, Ser. No. 802,722

7 Claims. (Cl. 324—51)

This invention relates to electrical testing devices and more particularly to a system for testing continuity of a circuit including a resistance device which may be buried in a material to be ignited.

Solid propellant materials and explosives are often ignited or detonated by means which includes an electrical resistance element buried in the material to which is supplied an electrical pulse of a certain voltage. This voltage is applied for a time sufficient to build up an energy level capable of detonating the material or any explosive elements which are relied upon to ignite the material. These elements and their associated circuitry cannot be checked functionally since they are destroyed in operation. It is apparent that any continuity checking which is done must be done in such a manner as to insure that accidental ignition does not take place. This has typically involved applying a voltage to the circuit of such low amplitude that the danger of igniting the charge is negligible; however, such tests have been found to be unreliable because the voltage used is often insufficient to overcome any extra resistance in the circuit such as that caused by a thin layer of oxide which may have accumulated on a terminal or connection. This would result in a finding that the circuit was open when actually it would be entirely operable were the proper voltage applied. It is therefore an object of the present invention to provide a continuity testing device for ignitor circuits which is reliable in operation yet presents negligible danger of detonating or igniting the charge.

It is another object to provide a continuity testing device for ignitor circuits which is very simple structurally and trouble-free in operation.

It is a further object to provide a continuity tester which accomplishes the above objects and which is easily integrated into an over-all electrical system such as the evaluation equipment used to determine the operating condition of a missile.

It is a further object to provide a continuity testing device which accomplishes the above objects and which is also effective to check for leakage resistance and for possible leakage paths that could detonate or ignite the associated explosive or propellant prematurely.

It is a further object to provide a continuity testing device which accomplishes the above objects and which effectively eliminates the danger of injury to personnel during testing of the associated missile or explosive.

Other objects and advantages will occur from the following specification taken in connection with the accompanying drawings in which.

Figure 1:
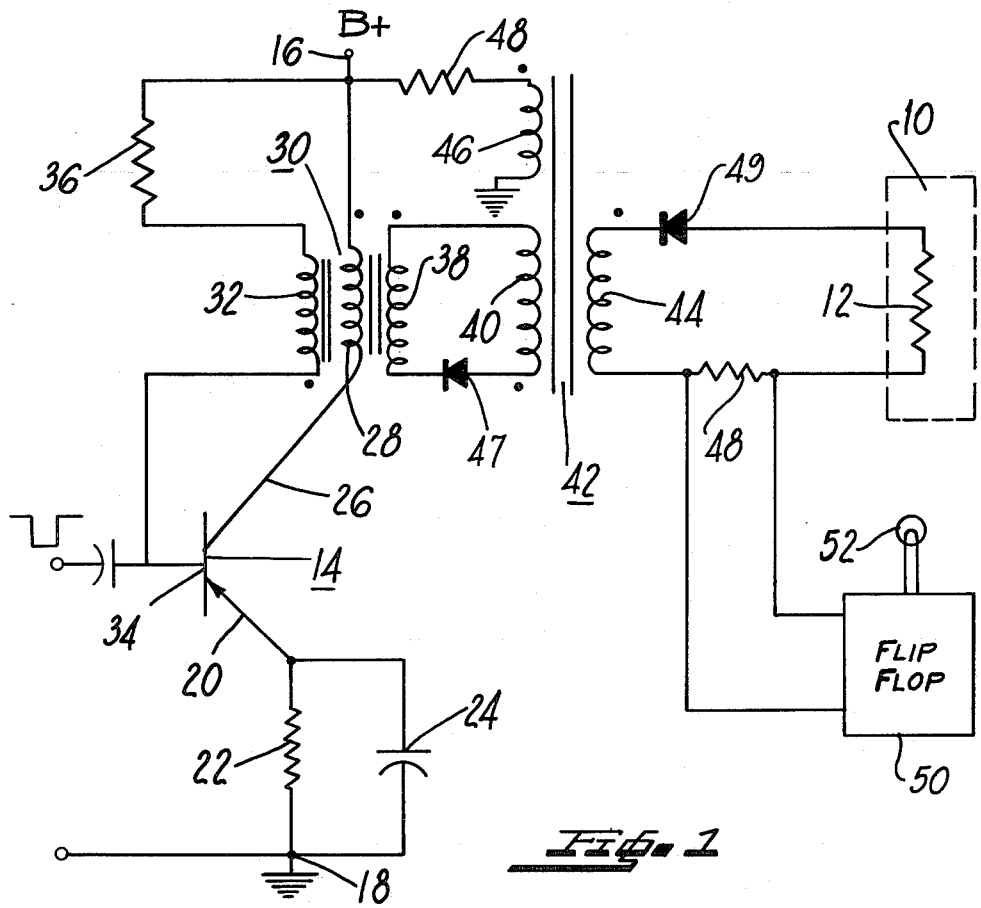
Figure 1 is a schematic drawing of a testing circuit embodying my invention.

Referring now to Figure 1, the material to be ignited or detonated is shown as a block 10 in which is buried a resistance element 12. The material 10 is normally ignited as a result of passing a prescribed number of watts of power through resistor 12 for a given time interval. In order to test the continuity of the circuit which is buried in the material 10, the structure hereinafter described is employed for the purpose of providing a voltage pulse to the resistor 12 which is of amplitude corresponding to that required to detonate the charge, but of a shorter time duration. A transistor 14 is connected between a source of B plus voltage connected to a terminal 16 and a ground terminal 18 in a grounded emitter configuration wherein the emitter 20 is connected to terminal 18 through a resistor 22 having a capacitor 24 in parallel therewith. The collector 26 is connected to the terminal 16 through one winding 28 of a transformer 30. A second winding 32 of transformer 30 is connected to the base 34 of transistor 14 and, through a resistor 36 to the terminal 16. A third winding 38 of transformer 30 is connected to an input winding 40 of a transformer 42 having also an output winding 44 and a reset winding 46. This connection includes a rectifier 47. Reset winding 46 is connected to the voltage terminal 16 through a resistor 48. Transformer 42 is of the saturable type in which the core material has a substantially square loop characteristic such that once a signal is received on the input winding 40 sufficient to saturate the core additional signals of the same polarity will cause no change in the saturation of the core hence no output from winding 44 until the core has again become unsaturated or reset. This resetting is brought about through the action of the reset winding 46 which is wound in opposition to the input winding 40 but which has fewer turns than the input winding 40. This winding is connected to the B plus voltage source through the resistor 48 which is of comparatively high value. Thus it will be apparent that the time required to reset the core of transformer 42 is considerably greater than that involved to cause its initial saturation. During the time the initial saturating signal is supplied to the transformer input winding 40, a corresponding voltage is induced in the output winding 44 and this voltage is impressed across the resistance element 12 and also across a load resistor 48 and a rectifier 49. The voltage drop across resistor 48 is proportional to that developed across the output winding 44. When this voltage is of an amplitude which reflects a voltage drop across resistance element 12 sufficient to cause ignition of the material in block 10, it becomes effective to actuate an indicating device which may consist of the well known Eccles-Jordan flip-flop circuit 50 which, in turn, may be used to operate an incandescent lamp 52.

Figure 2:
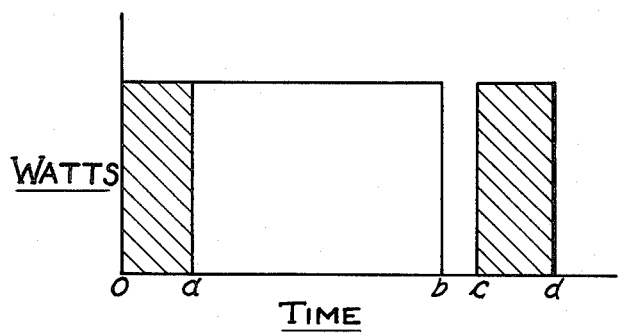
Figure 2 is a graph showing frequency of the pulses supplied by the device of Figure 1 and the energy level of these pulses in comparison to the energy level required to ignite the associated material.

Operation of the device heretofore described is as follows: In the absence of an input signal applied to the base 34 of the transistor 14, the transistor is maintained in a conducting condition and electron flow proceeds from the ground terminal 18 through resistor 22, the transistor 14, and transformer winding 28 to the B plus voltage terminal 16. Flow also proceeds from base 34 through the transformer 32 winding, the resistance 36 to the terminal 16. Inasmuch as this flow constitutes a steady direct current, there is no voltage induced in the winding 38 and consequently no voltage in the transformer input winding 40. There is also, of course, no voltage induced into the output winding 44 of transformer 42 and hence no voltage drop across the resistor 48 or the resistance element 12. When it is desired to test the continuity of the igniting circuit, a negative pulse is supplied to the input terminals shown connected to the base 34 of the transistor and the ground terminal 18. This negative pulse is effective to cause interruption in the flow through the transistor and hence through the winding 28 of the transformer 30. The resulting change in voltage drop across the winding 28 causes a voltage to be induced in the output winding 38 which voltage, being of proper polarity to pass the rectifier 47, results in a voltage drop across input winding 40 sufficient to drive the core of the transformer 42 into saturation. During the time transistor 42 is becoming saturated, a voltage is induced in the output winding 44 and this voltage, being of the proper polarity to pass the rectifier 49, is developed across resistor 48 and resistance element 12. This voltage is of full amplitude as compared with that acquired to detonate or ignite the material 10 but acts only for the time period required to saturate the core of the transformer 42. Figure 2 is a graph in which power input to the ignitor circuit is plotted against time. The number of watt-seconds required to ignite the material 10 is shown as the area of a rectangle extending from 0 to $b$ on the time axis. The energy level of the pulse supplied to the resistance element 12 by means of the continuity testing circuit is defined by the areas of the shaded rectangles. As shown by the graph, the power is supplied by the testing circuit at a wattage, hence voltage, level sufficient to accomplish ignition of the material 10; however, this voltage pulse occurs only for the period required to saturate the core of the transformer 42 and hence is far short of the time required to cause ignition or detonation of the material 10. Once the initial pulse, which acts over time period $o$–$a$, has succeeded in saturating the core of transformer 42 any additional voltage pulsations of the same polarity will have no effect on the output of the system. The current flowing through resistor 48 and the reset winding 46 acts to slowly unsaturate the core of transformer 42 and thereby again places it in condition to receive a saturating pulse of full amplitude. Because of the comparatively high resistance of resistor 48 the time period required to accomplish this resetting action is much longer than the time period of the saturating pulse and is shown in Figure 2 as being from $a$ to $c$. Because of the severe limitation which this reset system places on the frequency of test pulses, it will be clear that the continuity testing circuit will never be able to supply enough energy to cause ignition of the material 10. For purposes of testing, of course, it is sufficient to know whether or not the initial voltage pulse was impressed across resistance element 12. Should this circuit be open, there will be no voltage drop developed across the load resistor 48, hence no operation of the flip-flop circuit 50 and no visible indication from the light 52. The threshold voltage on the flip-flop circuit is, of course, chosen such that the successful passage of the test pulse results in energizing this circuit and maintaining this circuit in energized condition so that the lamp 52 will continue to indicate a complete circuit even though the initial testing pulse has long since passed and may not have been repeated.

Although only one embodiment is shown and described herein modifications may be made to suit the requirements of particular applications without departing from the scope of the present invention.

I claim:

1. A device for testing continuity of an electrical circuit including a resistance element adapted to supply sufficient energy to ignite an associated combustible material, comprising a transformer having a core of substantially square loop material and an input winding, a reset winding and an output winding, a connection between said output winding and said resistance element including a unidirectional conducting device, a load device and indicating means connected across said load device, a second transformer having first and second windings and an output winding, and connections between said output winding and the input winding of said first named transformer including a unidirectional conduction device, a direct current voltage source, a normally conducting switching device connected through said first winding to said source, feedback means including resistance means and said second winding connected between said switching device and said voltage source, and a connection between said voltage source and said reset winding including resistance means of sufficiently high value as to prevent said core from being conditioned to induce a full amplitude pulse in the output winding of said first named transformer for a time period substantially equal to that required for an applied voltage of said amplitude to ignite said combustible material.

2. A device for testing continuity of an electrical circuit having a resistance element which is buried in a material to be ignited comprising a transistor connected to a source of voltage in a grounded emitter configuration; a transformer having a first winding connected in the collector circuit of said transistor, a second winding connected between the base of said transistor and said source, and a third winding; a resistance device connected in series with said second winding and said source; a second transformer having a core of substantially square loop material including an input winding having connections to said third winding including a rectifier, a reset winding and a resistance device connected between said source and ground, and an output winding having connections with said resistance element including a rectifier and a load device; indicating means, and a flip-flop circuit connected to sense the voltage across said load device for actuating said indicating means.

3. A device for testing continuity of an electrical circuit including a resistance element for supplying energy to ignite a combustible material in which it is buried, comprising a source of direct current voltage, a switching device connected to said source, a transformer having a core of substantially square loop material and an input winding, an output winding, and a reset winding, means responsive to changes in the current flow through said switching device connected to said input winding, a load device connected in series with said resistance element across said output winding, indicating means connected across said load device, and a connection between said source and said reset winding including resistance means of sufficiently high value as to prevent said core from being reset for a time period substantially longer than that required to saturate said core.

4. A device for testing continuity of an electrical circuit including a resistance element for supplying energy to ignite a combustible material in which it is buried, comprising a source of direct current voltage, a normally conducting switching device connected to said source, a transformer having a core of substantially square loop material and an input winding, an output winding, and a reset winding, means responsive to changes in the current flow through said switching device having connections with said input winding, said connections including a rectifier, a rectifier and a load device connected in series with said resistance element across said output winding, indicating means connected across said load device, and a connection between said source and said reset winding including resistance means of sufficiently high value as to prevent said core from being reset for a time period substantially longer than that required to saturate said core.

5. A device for testing continuity of an electrical circuit including a resistance element adapted to supply energy at a desired power level for a desired time period to ignite a combustible material in which it is buried, comprising a source of direct current voltage, a switching device connected to said source, means for varying the current flow through said switching device, a saturable transformer having an input winding, an output winding and a reset winding, means responsive to variations in current flow through said switching device connected to said input winding, a unidirectional conducting device and a load device connected between said output winding and said resistance element, indicating means connected across said load device and a connection between said source and said reset winding including resistance means of sufficiently high value as to prevent said core from being reset for a time period substantially equal to said desired time period.

6. A device for testing continuity of an electrical circuit including a resistance element adapted to supply energy at a desired power level for a desired time period to ignite a combustible material in which it is buried, comprising a source of direct current voltage, a normally conducting switching device connected to said source, means for momentarily interrupting current flow through said switching device, a saturable transformer having an input winding, an output winding and a reset winding, means responsive to interruptions in current flow through said switching device connected to said input winding, a unidirectional conducting device and a load device connected between said output winding and said resistance element, an indicating device connected across said load device and a connection between said source and said reset winding including resistance means of sufficiently high value as to prevent said core from being reset for a time period substantially equal to said desired time period.

7. A device for testing continuity of an electrical circuit including a resistance element adapted to supply energy at a desired power level for a desired time period to ignite a combustible material in which it is buried, comprising a voltage source, means connected to said source for creating a voltage pulse of a desired polarity, saturable transformer means including an input winding, an output winding and a reset winding, and connections between said first named means and said input winding whereby the core of said transformer is saturated upon receiving said voltage pulse, means connecting said output winding to said resistance element including an indicating device, and a connection between said source and said reset winding including resistance means of such value as to prevent said core from being reset for a time period substantially longer than that required to saturate said core.

References Cited in the file of this patent

UNITED STATES PATENTS

| | | |
|---|---|---|
| 2,531,145 | Marco et al. | Nov. 21, 1950 |
| 2,749,510 | Rively | June 5, 1956 |
| 2,817,773 | McKenney | Dec. 24, 1957 |